United States Patent Office 2,791,918
Patented May 14, 1957

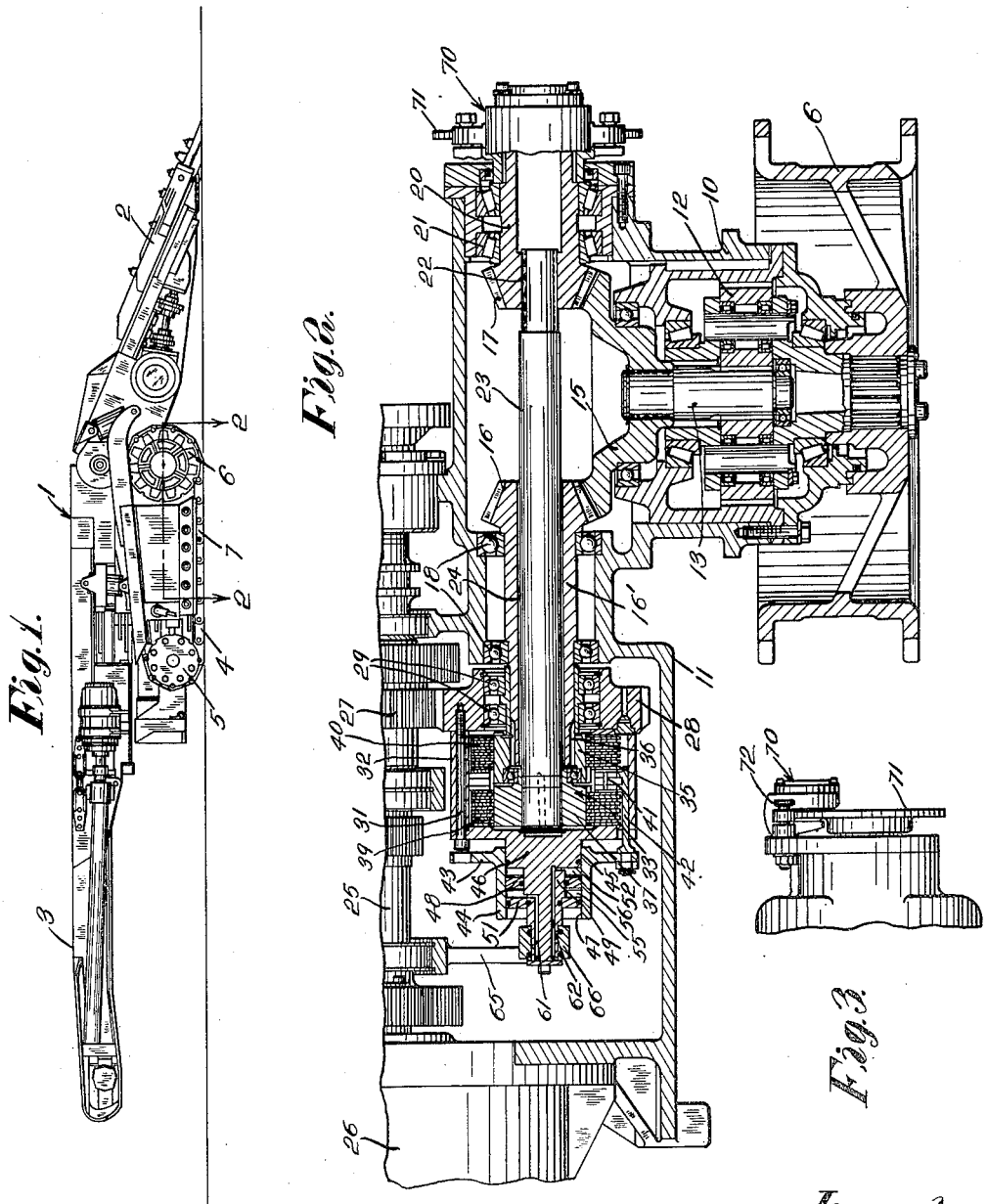

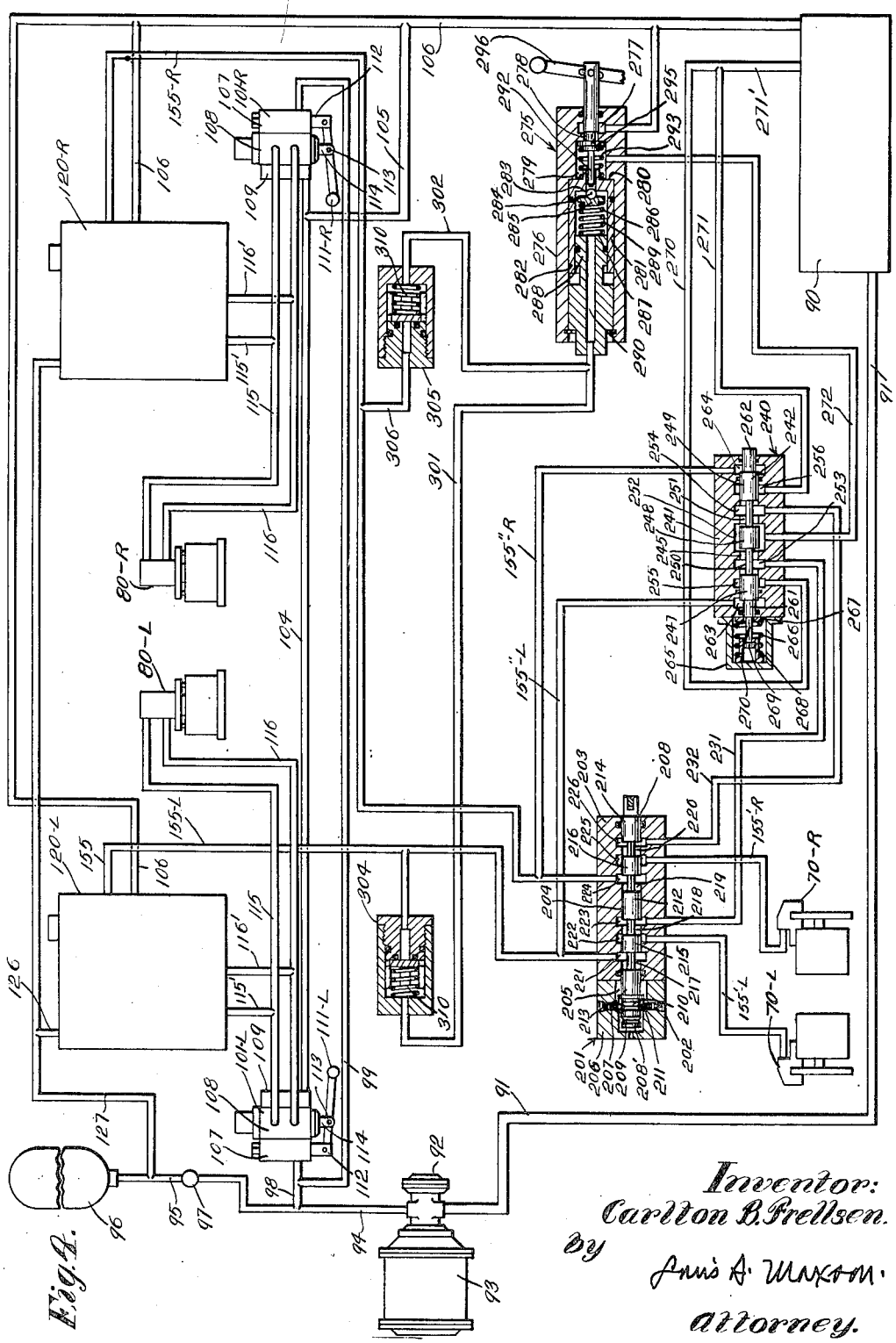

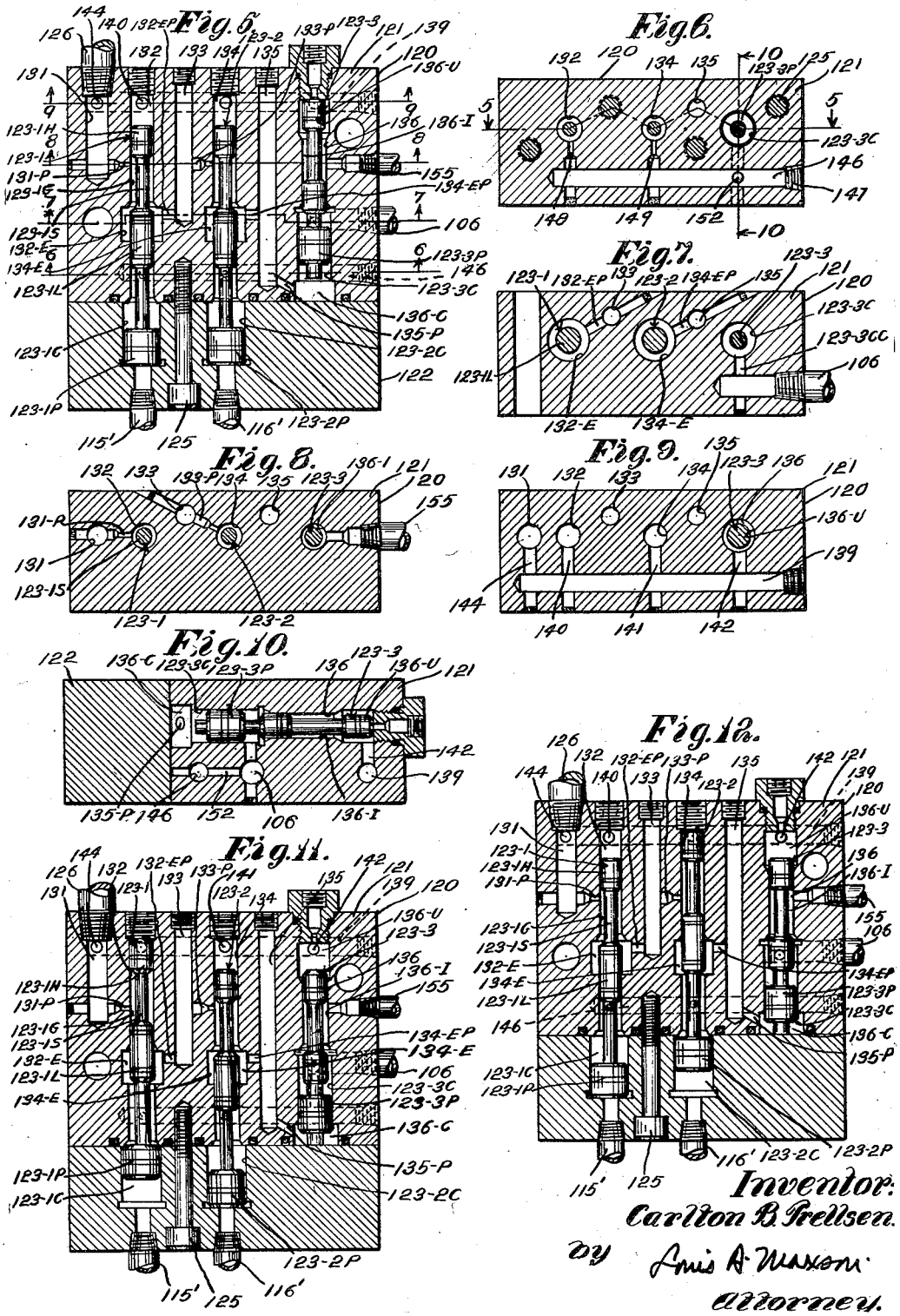

2,791,918

DRIVE CONTROLLING AND BRAKING DEVICES HAVING SELECTIVE AUTOMATIC AND MANUAL BRAKE CONTROL

Carlton B. Frellsen, Franklin, Pa., assignor to Joy Manufacturing Company, Pittsburgh, Pa., a corporation of Pennsylvania Application November 27, 1951, Serial No. 258,379

27 Claims. (Cl. 74—710.5)

This invention relates to improvements in the controlling mechanism for the propulsion and braking devices of mobile vehicles such as tractors, or tractor mounted equipment, and to drive-controlling and braking devices more generally.

Modern loading machines used in the mining of coal and other material consist of material gathering and conveying devices mounted on tractor treads or like track-laying devices. The bodies of these machines have a track-laying device at each side, and these devices are appropriately driven and braked, the braking function being important because of the need both for brake control in moving down steep places and for holding the machine stationary at the face when it has been rammed into the material to be loaded and also for steering during propulsion and in repositioning of the machine at the place where the work is to be performed.

It is important to be able to control the drive to either tread and the brakes which hold the tread stationary when it is desired to keep the machine immobile. The treads are provided ordinarily with individual drives, preferably plural speed; and, in any event, reversible, and brake devices are provided for the purpose of preventing the machine from moving when it is important that it be held stationary. At the face, it is desirable that the brakes should have what might be called a "snappy action"— that they be applied immediately the drive is discontinued, and a coordination of the control of the drive and the brake mechanism is very useful. Ordinarily, it is desirable at the face to have the brakes applied immediately the drive connection which may have been functioning, is discontinued. If an apparatus operating in this manner be provided, however, it is not so well suited for conditions encountered during the movement of the loading machine or other vehicle about the mine. In going down a steep grade, it might be desirable to disconnect the tracks from their power drives, but very important to be able to brake them, and if a connection is employed which necessitates the application of the brakes—or at least causes it automatically to occur—when the drive is interrupted, this operation would not be practicable without some modification for discontinuing the automatic control of the brakes coordinately with the drive clutches. Moreover, in making turns, it is by no means desirable at all times to have to turn as sharply as results from holding one tread while the other is driven, and it is also undesirable to have to depend on driving one tread at a fixed slow speed while the other may be driven at a higher speed. This will be obvious when it is considered that if the vehicle is moving in the desired direction and it is desired to keep its motion at a slow speed, and then it is desired to make a gradual turn, it would be impracticable to use the slow speed drive at one side to retard the drive of one tread while relying on the high speed drive at the other side to provide the differential in speeds which would cause the making of a turn.

It is an object of the present invention to provide an improved propulsion mechanism for tractor mounted vehicles. It is another object of the present invention to provide an improved drive and brake mechanism for vehicles. It is a further object of the invention to provide an improved drive and brake mechanism for vehicles having provision for effecting drive in either of opposite directions and effecting virtually instantaneous application of the brakes upon the interruption of drive, irrespective of the direction in which the latter has been taking place. It is another object of the invention to provide an improved drive and braking mechanism for vehicles in which there is associated with drive and brake mechanism in which the brakes are applied immediately upon interruption of drive, additional control means whereby the drive may be interrupted and the brakes placed under separate control so that their action may no longer be automatic in the manner previously mentioned. It is still a further object of the invention to provide an improved automatic and manual control for the brakes of a vehicle whereby selective control is possible. It is still another object of the invention to provide an improved arrangement in which automatic application of brakes may be accomplished or, selectively, manual control with the braking pressure determinable by the operator at will.

Other objects and advantages of the invention will hereinafter appear.

In the accompanying drawings, in which for purposes of illustration, one illustrative embodiment which the invention may assume in practice has been shown, Fig. 1 is a side elevational view of a loading machine in which the invention may be incorporated.

Fig. 2 is a horizontal section on the plane of the line 2—2 of Fig. 1, showing a portion of the driving and braking means for a track at one side of the vehicle of Fig. 1, the view being on an enlarged scale.

Fig. 3 is a plan view on a reduced scale of the brake shown at the right-hand end of Fig. 2.

Fig. 4 is a schematic diagram, with parts shown in section, showing a complete drive and control arrangement for the vehicle.

Fig. 5 is a vertical sectional view on the planes of the line 5—5 of Fig. 6 through a brake valve.

Figs. 6, 7, 8 and 9 are horizontal sections respectively on the planes of the lines 6—6, 7—7, 8—8 and 9—9 of Fig. 5.

Fig. 10 is a vertical transverse section on the plane of the line 10—10 of Fig. 6.

Figs. 11 and 12 are sectional views, similar to the view of Fig. 5, showing the parts in different position.

Referring now to Fig. 1, it will be noted that the machine 1 has a gathering mechanism 2 and a tail conveyor 3. It is supported at either side by a track-laying arrangement 4, of which only the one at the right-hand side is illustrated. This includes at either side of the machine a suitably adjustable idler sprocket 5 and a drive sprocket 6 and a chain made up of track-laying elements 7 passing around the two sprockets.

Fig. 2 shows one of the drive sprockets 6 in central horizontal section. This is mounted on a hollow projection 10 from a gear casing 11 forming a part of the machine 1, and is driven through a planetary reduction unit 12 from a shaft 13. The shaft 13 is suitably journaled and carries at its inner end a bevel gear 15. Bevel pinions 16 and 17 mesh with and are adapted to drive the bevel gear 15. The bevel pinion 16 is formed on a sleeve element 16' journaled as at 18 in the frame 11. The pinion 17 is mounted on a sleeve member 20, journaled as at 21 in a portion of the frame 11, and has a suitable spline connection at 22 with a shaft 23 which extends through a bore 24 in the sleeve 16'.

Motor driven reduction gearing, of which only a portion is shown, is to be noted at 25, and this may include desirably a plural speed drive and be driven by a motor in a casing 26. The terminal element of the reduction gearing 25 is a gear 27 which it will be understood may be driven at different speeds in a well-known manner by the plural speed reduction gearing 25. The gear 27 meshes with and is adapted to drive a gear 28 supported on bearings 29 upon the sleeve 16'. The gear 28 has secured to it by long screws 31 the housing 32 of a reversing clutch, generally designated 33. This clutch is adapted to connect the power rotated housing 32 selectively to an inner clutch member 35, splined as at 36 to the end of the sleeve 16' opposite the pinion 16, or to connect the housing 32 with an internal clutch member 37 which is secured to the end of the shaft 23 remote from the pinion 17. Stacks of clutch disks 39 and 40, each of which includes a series of disks having splined connection with the housing 32, and which individually include series of disks respectively splined to the elements 35 and 37 may be caused to drive the pinions 16 and 17 selectively, depending upon which set of disks are loaded. A suitable disk-loading arrangement is provided including between the stacks of disks a pressure applying device 41 which is adapted to be shifted in one direction or the other by means of arms 42 which are connected to a disk 43 which is carried by a sleeve 44 slidably supported as at 45 on an end closure element or head member 46 fastened to the housing 32. The sleeve 44 has a cylindrical bore 47, inside of which there is fastened a bored ring 48, the bore of which is a snug sliding fit for a projection 49 formed integral with the head 46. Mounted upon the projection 49 is an annular member 51 secured to the projection, and the head member 46 has a surface 52, and the annular element 48 may be caused to slide toward the surface 52 or toward the annular member 51 by the supply of fluid selectively to annular spaces 55 and 56 formed between the ring 48 and the surface 52 and between the ring 48 and the closure element 51. Passages 61 and 62 extend through the projection 49 and communicate respectively with the spaces 55 and 56. The mode of fluid supply and venting with respect to the passages 61 and 62 will be later explained. A support arm 65 carries a support 66 for the end of the projection 49.

At the end of the casing 11 opposite the head 46, braking means generally designated 70 is provided. This braking means includes a disk 71 attached to the sleeve 20 for rotation therewith. As the pinion 17 is always rotated when the sprocket 6 is rotated, it will be evident the rotation of the disk 71 will accompany rotation of the sprocket 6 and that when the disk 71 is held stationary, the sprocket 6 will be held stationary. A suitable hydraulic clamping device 72 is provided in association with the disk 71, and the supply of fluid to this clamping device serves to cause gripping of the disk, and retarding or holding stationary of the disk 71. Details of this mechanism are well known per se and need not be illustrated here. They are known and used widely in airplanes and elsewhere and are known as single-disc friction brakes. Thus far, there have been described clutch controlled reverse drives for one sprocket 6 and an associated brake for that sprocket. It will be understood that the structure shown in Fig. 2 below the gearing 25 is reproduced at the other side, and that each of the tractor devices at the opposite sides of the machine is provided with like reverse drives and brake means.

For the convenience in further reference, the structures for loading the friction clutches which have been described will be referred to as clutch operating cylinders 80 (Fig. 4) and the brakes will be, as previously noted, referred to as 70 (Fig. 4). Because of their duplication at opposite sides of the machine, parts will be distinguished from each other by the suffixes R or L as necessary, R and L being considered merely for convenience as being the right and left-hand sides of the apparatus looking from the delivery conveyor towards the gathering mechanism.

Attention may now be given to the diagrammatic view of Fig. 4. The brakes 70–L and 70–R are shown in the lower left-hand corner of this view. The clutch operating cylinders 80–L and 80–R are shown about at the center of the upper part of the view. As the apparatus is, as illustrated, hydraulically controlled, a reservoir or tank for hydraulic fluid is provided at 90. This is connected by a conduit 91 with a suitable pump 92 driven by a motor 93. The pump discharge line is shown at 94, and is connected by a check valve controlled conduit 95 with an accumulator 96. Any well-known form of accumulator may be employed. A check valve is designated 97 and permits fluid to pass to the accumulator 96 past it, but prevents return flow from the accumulator to the discharge line 94 of the pump. The discharge line 94 has a branch 98 which is connected with another branch 99. The branch 98 leads to an operating valve mechanism 101–L and the branch 99 to an operating valve 101–R. These operating valves are of well-known commercial types and they include various structure which will now be described. Each is connected, it may be noted, with a vent line 104 and the vent line is connected by a conduit 105 with a return line 106 which leads back to the tank 90.

Each of the operating valves 101–L and 101–R is provided with a relief valve section 107, a valve box section 108 and a discharge section 109. Within the relief valve section 107 is a relief valve (not shown) which is adapted to open and permit the passage of fluid freely from the pump discharge to the vent line 104 if the pressure becomes excessive. This is a well-known construction and needs no illustration. Within the valve box section 108 is mounted a piston type reciprocable valve (not illustrated). This may have its position shifted by an operating handle 111 pivotally supported at 112 and connected at 113 pivotally with the stem 114 of the valve which is within the box 108. The discharge section 109 needs little further said about it save that it is so connected with the section 108 that the valve within the latter section may connect the passages which it controls with the vent 104. The valve box section 108 is connected with two conduits 115 and 116. These lead directly to the passages 61 and 62 of the clutch operating cylinder mechanisms 80. Branch lines 115' and 116' lead from the conduits 115 and 116 to brake valve mechanisms 120, there being of course duplication of the brake valve mechanisms, as well as of the operating valve mechanisms, for the purpose of providing control of the left and right-hand tractor mechanisms. In the mid-positions of the valves controlled by the operating handles 111, the pump discharge is connected with the reservoir 90 via the discharge sections 109.

One of the brake valve mechanisms 120 is shown in detail on Fig. 5 of the drawings. These mechanisms may assume various forms, but, for purposes of illustration, a form which has been found highly satisfactory is shown. Each mechanism 120 includes a casing portion 121 and a bottom portion 122. The mechanisms 120 each include three valve elements, which I prefer to call shuttle plugs, and three pistons. The three shuttle plugs are designated respectively as 123–1, 123–2 and 123–3, and the associated pistons are designated respectively 123–1P, 123–2P and 123–3P. The portions 121 and 122 are connected together in any suitable manner as by screw devices 125. The pistons 123–1P and 123–2P are received in cylinders 123–1C and 123–2C formed in the portion 122. The piston 123–3P is received in a cylinder 123–3C formed in the portion 121. The pistons 123–1P, 123–2P and 123–3P are all of greater effective area than the associated shuttle plugs, so that they can always force the latter upwardly, when their lower ends are subjected to suitable pressure, against the downwardly acting accumulator pressure on the shuttle plugs.

The portion 121 is provided with six bores of various lengths, respectively numbered 131, 132, 133, 134, 135 and 136. Bore 131 is short, and is connected by a conduit 126 with a pressure line 127, which is connected with the accumulator 96 through a portion of the conduit 95. Bore 131 is in the upper left-hand corner of the portion 121 as shown in Fig. 5. The bore 132 is in alignment with the cylinder 123–1C and extends completely through the portion 121. It is arranged near the bore 131 and receives and guides the shuttle plug 123–1. It has an enlargement 132–E between its ends, which enlargement is connected by a passage 132–EP with the bottom of the bore 133. The shuttle plug 123–1 has upper and lower heads 123–1H and 123–1L, spaced by a stem portion 123–1S surrounded by a fluid conducting groove 123–1G. The head 123–1L is longer than the head 123–1H. Passage 131–P connects the lower portion of the bore 131 with a point in the bore 132 which may be connected, by the groove 123–1G, when the shuttle plug 123–1 is in its lower position, with the enlargement 132–E. The bore 133 extends from the top of the portion 121 down to a point opposite the enlargement 132–E. The bores 132 and 133 are plugged in any suitable manner at their tops. The bore 133 has a connection 133–P with the bore 134 in which the shuttle plug 123–2 is reciprocable. The passage 133–P is directly opposite, that is, in the same horizontal planes with, the passage 131–P.

The bore 134 has an enlargement 134–E which is connected by a passage 134–EP with the bore 135, which latter bore is closed at its top and extends nearly to the bottom of the portion 121, where it is connected by a passage 135–P with a chamber 136–C at the bottom of the cylinder 123–3C, and which forms the very lowest portion of bore 136, which has an enlarged upper end portion 136–U, an intermediate portion 136–I in which the shuttle plug 123–3 is slidably reciprocable, and a communication between the bottom of the portion 136–I and the cylinder 123–3C, which is of slightly larger diameter.

Now, it may be further noted that a horizontal passage 139 extends crosswise at the upper end of the portion 121 and is connected by passages 140, 141 and 142 respectively with the bores 132, 134 and 136 and by a passage 144 with the bore 131. This may be seen in Fig. 9.

Fig. 7 shows the connections 132–EP and 134–EP respectively connecting the enlargement 132–E and the bore or passage 133 and the enlargement 134–E with the bore or passage 135. Fig. 6 shows the connection with a passage 146, plugged at one end as at 147, through passages 148 and 149, of the bores 132 and 134, and it shows a connection 152 between the passage 146 and the return conduit 106. The passage 146 is always, therefore, at vent line pressure. Fig. 7 further shows at 123–3CC the connection of the upper end of the cylinder 123–3C with the return conduit 106.

It may be noted that the several pistons 123–1P, 123–2P and 123–3P have stem portions which are adapted to engage the bottoms of the shuttle plugs with which they are respectively associated. The intermediate portion 136–I of the bore 136 is connected with a conduit 155 which leads ultimately (or which might, so far as certain aspects of the invention are concerned, lead directly) to one of the brake operating cylinders, 70. It will be observed that the conduit 115' leads to the bottom of the cylinder 123–1C and the conduit 116' leads to the bottom of the cylinder 123–2C.

Before going into a more detailed discussion of the mode of operation of the brake valve mechanism which has been described in some detail, it may be well to summarize the external connections briefly. The bore 131 is connected with a conduit 126 which leads ultimately to the accumulator. The cylinder 123–1C is connected by the conduit 115' and the conduit 115 with the operating valve. The conduit 116' and associated conduit 116, is also connected with the operating valve and leads to the cylinder 123–2C. The intermediate portion 136–I of the bore 136 is connected with the conduit 155 leading to a brake, and the conduit 106 is of course connected to vent—i. e. back to the reservoir 90. It will be observed that, due to the chamfering of the upper heads of the shuttle plugs 123–1, 123–2 and 123–3, the upper ends of the bores 132, 134 and 136 are always, therefore, never wholly shut off from the accumulator.

The operation of this portion of the mechanism may now be described in more detail. Let it be assumed that the operating valve 101–L is moved to connect conduit 98 with associated conduit 115. Fluid will then flow through the conduit 115' into the bottom of cylinder 123–1C and force the piston 123–1P upwardly and raise the shuttle plug 123–1 into the position shown in Fig. 11. Under these circumstances, not only will there be an application of one of the clutches by the fluid supplied through the conduit 15, but there will also be a venting of the associated brake mechanism 70 due to the venting of the conduit 155 through the space 136–I, the upper end of the cylinder 123–3C, and the lateral connection with the conduit 106 leading to the tank. This venting will be possible because the chamber 136–C will have been vented through passage 135–P, bore 135, passage 134–EP, enlargement 134–E, the space between the heads of the shuttle plug 123–2, passage 133–P, bore 133, passage 132–EP, enlargement 132–E, the lower portion of bore 132, passage 148, passage 146, passage 152 and conduit 106.

Now, if the lever 111 is used to control the operating valve 101 so as to effect the supply of fluid through the conduit 116 and the branch conduit 116', instead of conduit 115 and the branch conduit 115', there will be not only a loading of the other clutch in the apparatus 80, but there will be a venting of the brake by the connections as indicated in Fig. 12, just exactly in the same manner as has been pointed out with respect to Fig. 11. This time, however, the piston 123–3P moves down because the chamber 136–C is vented through passage 135–P, bore 135, passage 134–EP, enlargement 134–E, the lower end of bore 134, passage 149, passage 146 and passage 152 to the vent conduit 106.

It may be noted that in the position of the parts shown in Fig. 11 the pressure from the accumulator 96 gets no further than the space between the heads 123–1H and 123–1L, while in Fig. 12 this pressure gets no further than the space between the heads of the shuttle plug 123–2.

If no pressure is supplied to either the cylinder 123–1C or 123–2C, but instead both of the conduits 115' and 116' are vented to the tank, as occurs when the operating valve is in midposition, it will be understood that the shuttle plugs 123–1 and 123–2 will be in their lower positions as shown in Fig. 5, and under these circumstances accumulator pressure will pass from the bore 131 through the connection 131–P into the bore 132, then through the connection 132–EP with the enlargement 132–E, into the bore 133, and through the latter, and by way of the connection 133–P, into the bore 134, and then through the enlargement 134–E and the passage 134–EP into the bore 135, and finally through the passage 135–P into the chamber 136–C and force the piston 123–3P upwardly, raising the shuttle plug 123–3 to the position shown in Fig. 5, and in that position of the parts a connection between the brake and the tank will be broken by the lower head of the shuttle plug, and the conduit 155 leading to the brake will be placed in communication with accumulator pressure through the passage 139 and the passage 142, and accordingly the brake will be applied.

Now, it will be noted that, by the control of the handle 111, either the forward or reverse clutch may be applied, and simultaneously and immediately the brake will be made inoperative. On the other hand, the instant that the handle 111 is moved to midposition the brake will be applied, and which ever one of the clutches has been loaded will be unloaded. It will be noted, moreover, that when the handle 111 is in midposition, that is, when the loading machine is stationary and having no power applied to its treads, the brakes will be automatically on. Note that the brake application is by accumulator pressure. The foregoing assumes that the conduits 155 at their ends remote from the mechanisms 120 are connected to the brake mechanisms 70, a situation that is provided for by the mechanism later described, or could of course be provided for by a suitable permanent hook-up.

The portion of the invention so far described posesses utility in itself and is claimed hereafter in this application, but as above indicated, it is frequently desirable to have the brakes applied when the clutches are not engaged, and it is also desirable to be able to provide variable braking of one tread or the other and accordingly, I have superimposed on the apparatus so far described and which it is of course understood is duplicated at opposite sides of the machine, the following arrangements which permit either manual or automatic control of the brakes, the automatic control being just as described, but the manual control permitting adjustable governing of the brakes even though the brakes, in the absence of the so-called manual control, would be completely applied. Once again there is a good deal of duplication of structure, but there is also provided certain mechanism whereby a single manual brake valve may control the pressure of either brake device depending upon which brake device would, under the setting of the operating valves, be applied in the absence of the auxiliary mechanism. This auxiliary mechanism or superimposed control, includes by way of preliminary summation, a pair of check valved connections with the lines 155 which lead to the brakes, a manually operable manual-automatic control valve, an automatic brake selector valve, and a manual brake valve. We may now turn to a more detailed discussion of these arrangements.

As has been pointed out, the connections 155-L and 155-R which are supplied with fluid under pressure to effect brake application, might if desired, and with considerable advantage, but with less useful capacity of the whole apparatus than through the use of the superimposed controls, be led directly to the brakes 70-L and 70-R respectively, and the brakes 70-L and 70-R, in a certain position of the manual-automatic control valve, which is generally designated 201, may be directly connected with the conduits 155-L and 155-R, respectively.

The manual-automatic control valve 201 includes a multi-piece box structure 202. In the main portion 203 thereof, there is an elongated bore 204 surrounded by a plurality of annular grooves, which are symmetrically arranged at opposite sides of the center of this box element. The bore 204 opens through the end of the element 203 and into a chamber 205 in a box element 206, and spring detent means 207 is arranged in the box element 206 for holding a valve element 208 in one or another of its positions. To this end, the valve element 208 has an extension 208' surrounded by two grooves 209 and 210, in which spring pressed balls 211 selectively engage. The valve 208 has a center spool or head 212 and two end spools or heads 213 and 214, and two intermediate spools or heads 215 and 216. These spools or heads are separated from each other by grooves.

A groove 217 is formed between the heads 213 and 215, a groove 218 between the heads 215 and 212, a groove 219 between the heads 212 and 216, and a groove 220 between the heads 216 and 214. With reference to the annular grooves which communicate with the bore 204, it may be noted that these, starting at the left-hand end in Fig. 4, are numbered respectively 221, 222, 223, 224, 225 and 226. The groove 217 may connect grooves 221 and 222 together, while simultaneously the grooves 224 and 225 are connected together by the groove 219, this, in one position of the valve 208. In the other position of the valve, the one shown in Fig. 4. the grooves 222 and 223 may be connected by the groove 218, while the grooves 225 and 226 are connected by the groove 220. The connections of the various grooves in the valve box element 203 is as follows: Conduit 155-L leads to the groove 221; conduit 155-R leads to the groove 224; conduit 155'-L leads to the groove 222, and the conduit 155'-R leads to the groove 225. The grooves 223 and 226 are connected with conduits 231 and 232 respectively, whose connections with the brake selector valve structure previously mentioned, will be shortly explained in detail.

Reverting to the structure of the automatic control valve, it will be apparent that in the position of the valve 208 in Fig. 4, conduit 155'-L is connected with the conduit 231 through the groove 218, while the conduit 155'-R is connected through the groove 220 with the conduit 232. If the valve 208 were shifted to its opposite position, that is, shifted toward the right, there would be established connections between the conduits 155-L and 155'-L through the groove 217 in the valve, and connections between the conduit 155-R and the conduit 155'-R through the groove 219 in the valve. Under such circumstances, the control would be wholly by the levers 111 of the operating valves previously described. In the position of the valve 208 shown in Fig. 4, the control of the brakes is placed under the control of the manual brake valve, which will shortly be described, even though the conduits 155-L and 155-R may be supplied with pressure due to the centering of the operating valves by their respective handles 111-L and 111-R.

The brake selector valve is generally designated 240 and this is an automatic valve mechanism which includes a valve box 241 and a valve element 242 and which has the valve element automatically shifted in position depending upon whether the conduit 155-L, the conduit 155-R, or both, or neither, is supplied with fluid under pressure. Of course, when no fluid under pressure is present in the lines 155-L and 155-R, there would be no possible braking by the brake devices 70-L and 70-R, so the fact that the valve element 242 will at that time be in central position, in which position it is capable of permitting the supply of fluid to both of the brakes 70-L and 70-R, would be immaterial. The valve box 241 is provided with a bore 245 in which the valve 242 is reciprocable. The valve 242 is a balanced type valve and has three spools or heads 247, 248 and 249, with grooves 250 and 251 between the heads 247 and 248 and the heads 248 and 249 respectively. The valve box bore 245 is surrounded by an enlarged central internal groove 252, a pair of narrower spaced grooves 253 and 254, and a further pair of grooves 255 and 256, still nearer the remote ends of the bore. The valve element has stem portions 261 and 262 at its ends, these being of like cross-sectional area. Finally, it may be noted that the bore in which the valve 242 is reciprocable has end chambers 263 and 264, and at one end of the valve block there is arranged a housing 265 in which a spring 266, a washer 267 and a thimble 268 are arranged in cooperation with the valve to maintain the latter normally in center position, and to return it automatically to center position when this is made possible by changes in the fluid pressure acting on the valve. It will be noted that the washer 267 engages the stem 261, while a head 269 connected with the valve by a reduced portion 269', coacts with the thimble 268, and thereby the spring 266 is enabled to exert pressure, either through the washer or the thimble whenever the valve is displaced from midposition. The fluid connections not already mentioned with respect to the brake selector valve, are as follows: A conduit 155"-L connects condlit 155-L with the end chamber 263, a conduit 155"-R connects conduit 155-R with the end chamber 264. It has already been noted that connections 231 and 232 lead to tthe valve box 240, and these respectively open into the grooves 253 and 254. The grooves 255 and 256 are connected with conduits 270 and 271 respectively, which lead back through a common conduit 271' to the reservoir 90. In the midposition of the valve shown in Fig. 4, it will be evident that the brake operating devices 70-L and 70-R are connected with each other and, through the center groove 252 in the valve box with a conduit 272, which leads to the manual brake valve, later to be described. It is thus possible for the manual brake valve to apply braking pressure to both of the brakes. If the line 155-L were under pressure, fluid would be discharged through the conduit 155''-L to the chamber 263 and shift the valve in the brake selector valve device to the right in Fig. 4 and thereby there would be a connection between the conduit 272 and the conduit 231, and accordingly, with the conduit 155'-L, while the connection of 272 with the conduit 232 and the conduit 155'-R would be shut off. If, on the other hand, the line 155-R were under pressure, pressure would pass through the conduit 155''-R and act on the hight-hand end of the valve 242 and force the latter to the left in Fig. 4, and this would interrupt the communication between the conduit 272 and the conduit 231, and prevent application of the left-hand brake 70-L while providing for free communication between the conduit 272 and the conduit 232, and thus make possible the application as desired of the right-hand brake.

The manual brake valve is numbered generally 275. It includes a housing 276 in which there are formed three chambers, 277, 279 and 281, chamber 277 being connectable through a reduced passage 278 with chamber 279, and chamber 279 having a seat 280 at its end where it communicates with chamber 281 which is a somewhat enlarged chamber. A valve-seat-carrying plunger 282 is reciprocable in the chamber 281. The valve-seat-carrying plunger has a valve seat 283 upon which a ball valve 284 is adapted to seat. Seating pressure is applied to the ball by a follower 285 forced against it by a spring 286, which reacts on an abutment member 287 having a head portion 288 which is received in a bore 289 in the valve-seat-carrying element or plunger 282, and which is traversed by a passage 290, through which fluid is adapted to be supplied. The valve ball 284 may be unseated by a plunger 292, which is normally held by a spring 293 away from the ball and which carries a collar 295 which is adapted to seal the passage 278 when the operating handle 296 of the valve is in right-hand position, the position to which the spring 293 would normally tend to press it. The passage 290 is connected with conduits 301 and 302. Conduit 301 is communicable under the control of a check valve 304 with the line 155-L. Conduit 302 is communicable under the control of the check valve 305 and a conduit 306 with the conduit 155-R. The check valves are peripherally longitudinally grooved hollow bodies pressed toward their seats by springs 310. Each permits flow from its respective line 155-L or 155-R to the conduit 301 or 302 which is connected with it. Accordingly, when fluid under pressure is supplied to the lines 155-L or 155-R or both of them, fluid is also supplied to the passage 290 in the abutment member 287 of the manual brake valve, and is available for passage into the chamber 279 when the ball valve 284 is unseated. When this ball valve is unseated, pressure may pass to the line 272. When the ball valve is unseated a substantial distance the restricted passage at 278 is cut off. A slight movement of the lever 296 in a direction to open the ball valve 284 is possible before this valve is unseated, and this may be made use of to permit bleeding of pressure back through the passage 106 from the chamber 277.

It will be noted that when the ball valve 284 is unseated and pressure passes into the chamber 279 which communicates with the passage 272, pressure builds up in that chamber and acts on the end of the plunger 282, and this is moved against the action of the spring 286 in a direction to return the seat to the unseated ball, and it is necessary to continue to move the manual lever 296 to the left in order to continue to effect a supply of fluid to the conduit 272. As the plunger to which the lever 296 is connected displaces fluid as it is moved to the left, it will be obvious that the pressure which is supplied to the conduit will also be applied to the plunger, and accordingly the operator will be advised of the pressure which he is causing to have applied to the brakes, by the resistance to movement of the lever 296. Thus, the operator can gauge the brake pressure with nicety.

O-rings or other suitable packings are used wherever needed, and have not been considered to require individual references.

A brief summary of the mode of operation of the overriding control may now be given. It will be apparent that there is but one manual brake valve required, irrespective of which brake is to be operated. It will be apparent that the brake selector valve is automatically shifted in accordance with which one of the brake valves 120 is supplying pressure to its line leading to a brake. If the valve 120-L is supplying pressure fluid to the line 155-L the brake selector valve will shift so as to permit the supply under the control of the operating lever 296 of braking pressure to the brake device 70-L. If the right-hand brake valve 120-R is supplying pressure, or causing its supply, to the line 155-R the brake selector valve will be shifted in such a manner as to cause the supply of fluid to the right-hand brake 70-R, when the operating lever 296 of the manual brake valve is shifted to permit the supply of pressure to the line 272. When both of the lines 155-L and 155-R are being supplied with fluid under pressure the brake selector valve will have its valve element centered, and it will therefore be possible for the operator, by controlling the operating lever 296 to supply pressure equally to the brakes 70-L and 70-R. Due to the provision of the check valves 304 and 305, no fluid can escape from the lines 301 or 302 back into the lines 155-L or 155-R, and accordingly the supply of fluid to one of the lines 155-L or 155-R cannot cause the building up of pressure in the other.

When the vehicle is moving about the mine, fluid will be relieved from both of the lines 155-L and 155-R, provided the motion is rectilinear. If, however, the operator wishes to drive either drive sprocket 6 and to interrupt the drive of the other, he does not need to cause the other drive sprocket to be immediately locked, but can under the control which has been described, regulate the braking action by the amount of pressure he exerts on the operating handle 296. Also, if it be desired to permit the vehicle to go down a steep place in the mine or over some other steep inclination, power may be cut off from both sprockets and the degree of braking of these sprockets may be controlled by the lever 296, and the vehicle may have its rate of movement thereby controlled without having power supplied to the sprockets. Other possible operations will be evident to those who have read the foregoing description.

It will be apparent that, due to the presence of the manual-automatic control valve, the vehicle may be controlled, as at a face, without any regard to the presence of the overriding control mechanism which has been described, merely by shifting the manual-automatic control valve into the position opposite the one which is shown in Fig. 4. On the other hand, any time that it is desired to relieve the brakes of the automatic control which would otherwise be imposed on them under the manipulation of the levers 111-L and 111-R, the manual-automatic control valve can be shifted into the position indicated in Fig. 4 and all the advantages of the superimposed control and variable adjustment of the brakes may be secured. As previously pointed out, this superimposed control is automatically made applicable to either or both of the brakes, depending on whether the right or left-hand brake valve 120, or both, are in such position (the position of Fig. 5), as to cause fluid to be supplied to either or both of the lines 155-L and 155-R; and, as previously noted, the manual brake valve may be controlled to provide just such pressure to the brakes as is desired, and the operator has a feel of the brakes, due to the construction of this manual brake valve. Moreover, the manual brake valve can be used by manipulation of it a distance insufficient to unseat the ball valve, to vent pressure previously supplied to the brakes.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim is:

1. In combination, an element to be selectively driven and braked, and driving and braking means therefor including a hydraulically operable clutch for effecting drive of said element in one direction, a hydraulically operable clutch for effecting drive of said element in an opposite direction, a hydraulically applicable brake, a fluid reservoir, a pump having its intake connected with said reservoir and its discharge connected with a fluid conduit, an accumulator having a check valve controlled supply connection with said conduit, a manually controlled operating valve device also connected with said conduit, conduits leading from said valve device to each of said hydraulically operable clutches, a vent line leading from said valve device, said valve device operable to connect the pump discharge conduit separately with said hydraulically controlled clutches and to connect each of said hydraulically controlled clutches to the vent line while the other is connected to the pump discharge and also to connect both of said hydraulically controlled clutches simultaneously to the vent line, and valve means for connecting said hydraulically applicable brake with said accumulator, to effect brake application, whenever said hydraulically operable clutches are both connected to the vent line, including valve elements each having an operating connection with one of the conduits leading from said operating valve device to a hydraulically operable clutch.

2. In combination, an element to be selectively driven and braked, and driving and braking means therefor including a hydraulically operable clutch for effecting drive of said element in one direction, a hydraulically operable clutch for effecting drive of said element in an opposite direction, a hydraulically applicable brake, a fluid reservoir, a pump having its intake connected with said reservoir and its discharge connected with a fluid conduit, an accumulator having a check valve controlled supply connection with said conduit, a manually controlled operating valve device also connected with said conduit, conduits leading from said valve device to each of said hydraulically operable clutches, a vent line leading from said valve device, said valve device operable to connect the pump discharge conduit separately with said hydraulically controlled clutches and to connect each of said hydraulically controlled clutches to the vent line while the other is connected to the pump discharge and also to connect both of said hydraulically controlled clutches simultaneously to the vent line, and valve means for connecting said hydraulically applicable brake with said accumulator whenever said hydraulically operable clutches are both connected to the vent line, including valve elements each having an operating connection with one of the conduits leading from said operating valve device to a hydraulically operable clutch, and a third valve element providing a groove connectable with the fluid reservoir or with the accumulator under the control of said first mentioned valve elements and controlling the connection of said hydraulically applicable brake selectively with the accumulator and the reservoir.

3. In combination, an element to be selectively driven and braked, and driving and braking means therefor including a hydraulically operable clutch for effecting drive of said element in one direction, a hydraulically operable clutch for effecting drive of said element in an opposite direction, a hydraulically applicable brake, a fluid reservoir, a pump having its intake connected with said reservoir and its discharge connected with a fluid conduit, an accumulator having a check valve controlled supply connection with said conduit, a manually controlled operating valve device also connected with said conduit, conduits leading from said valve device to each of said hydraulically operable clutches, a vent line leading from said valve device, said valve device operable to connect the pump discharge conduit separately with said hydraulically controlled clutches and to connect each of said hydraulically controlled clutches to the vent line while the other is connected to the pump discharge and to connect both of said hydraulically controlled clutches simultaneously to the vent line, and valve means for connecting said hydraulically applicable brake with said accumulator, whenever said hydraulically operable clutches are both connected to the vent line, including valve elements each having an operating connection with one of the conduits leading from said valve device to a hydraulically operable clutch, and a third valve element providing a groove connectable with the fluid reservoir or with the accumulator under the control of said first mentioned valve elements and controlling the connection of said hydraulically applicable brake selectively with the accumulator and the reservoir, each of said first mentioned valve elements when actuated by fluid supplied through its operating connection effecting a connection of the groove of said third valve element with the reservoir.

4. In combination, an element to be selectively driven and braked and driving and braking means therefor including a hydraulically operable clutch for effecting drive of said element in one direction, a hydraulically operable clutch for effecting drive of said element in an opposite direction, a hydraulically applicable brake, a fluid reservoir, a pump having its intake connected with said reservoir and its discharge connected with a fluid conduit, an accumulator having a check valve controlled supply connection with said conduit, a manually controlled operating valve device also connected with said conduit, conduits leading from said valve device to each of said hydraulically operable clutches, a vent line leading from said valve device, said valve device operable to connect the pump discharge conduit separately with said hydraulically controlled clutches and to connect each of said hydraulically controlled clutches to the vent line while the other is connected to the pump discharge and also to connect both of said hydraulically controlled clutches simultaneously to the vent line, and valve means for connecting said hydraulically applicable brake with said accumulator whenever said hydraulically operable clutches are both connected to the vent line including valve elements each having an operating connection with one of the conduits leading from said operating valve device to a hydraulically operable clutch, and a third valve element for connecting said brake with the fluid reservoir or with the accumulator under the control of said first mentioned valve elements and controlling the connection of said hydraulically applicable brake selectively with the accumulator and the reservoir, said first mentioned valve elements when simultaneously connected with the vent line effecting a connection by said third valve element of said brake to said accumulator for effecting operation thereof by fluid from the accumulator.

5. In combination, an element to be selectively driven and braked and driving and braking means therefor including a hydraulically operable clutch for effecting drive of said element in one direction, a hydraulically operable clutch for effecting drive of said element in an opposite direction, a hydraulically applicable brake, a fluid reservoir, a pump having its intake connected with said reservoir and its discharge connected with a fluid conduit, an accumulator having a check valve controlled supply connection with said conduit, a manually controlled operating valve device also connected with said conduit, conduits leading from said valve device to each of said hydraulically operable clutches, a vent line leading from said valve device, said valve device operable to connect the pump discharge conduit separately with said hydraulically controlled clutches and to connect each of said hydraulically controlled clutches to the vent line while the other is connected to the pump discharge and also to connect both of said hydraulically controlled clutches simultaneously to the vent line, and valve means for connecting said hydraulically applicable brake with said accumulator whenever said hydraulically operable clutches are both connected to the vent line including valve elements each having an operating connection with one of the conduits leading from said valve device to a hydraulically operable clutch, and a third valve element for connecting said brake with the fluid reservoir or with the accumulator under the control of said first mentioned valve elements and controlling the connection of said hydraulically applicable brake selectively with the accumulator and the reservoir, each of said first mentioned valve elements when actuated by fluid supplied through its operating connection effecting a connection by said third valve element of said brake with the reservoir, said first mentioned valve elements when simultaneously connected with the vent line effecting a connection of said third valve element to said accumulator to effect brake operation by fluid from the accumulator.

6. In combination, an element rotatable to effect vehicle drive, a drive clutch for said element having hydraulic operating means, a brake for said element having hydraulic operating means, and means for alternatively applying hydraulic fluid to said first mentioned hydraulic operating means and venting the other to effect drive of said element, or applying hydraulic fluid to said second mentioned hydraulic means and venting the first to interrupt drive and effect holding of said element stationary including a first conduit means supplied with pressure fluid to effect brake application and having pressure fluid vented therefrom to effect brake release, valve means for at will effecting pressure fluid supply to and release from said first conduit means, a second conduit means leading to said hydraulic operating means for said brake, and means for connecting said first and second conduit means together or for disconnecting them and establishing another connection for said second mentioned conduit means, said another connection including a third conduit means connectable with said second conduit means, a fourth conduit means branching from said first conduit means and having a portion thereof in continuous free communication with the latter, and manually controlled means for supplying fluid at operator selected pressures between said fourth and third conduit means.

7. In combination, an element rotatable to effect vehicle drive, a drive clutch for said element having hydraulic operating means, a brake for said element having hydraulic operating means, means for alternatively applying hydraulic fluid to said first mentioned hydraulic operating means and venting the other to effect drive of said element, or applying hydraulic fluid to said second mentioned hydraulic means and venting the first to interrupt drive and effect holding of said element stationary including a first conduit means supplied with pressure fluid to effect brake application and having pressure fluid vented therefrom to effect brake release, valve means for at will effecting pressure fluid supply to and release from said first conduit means, a second conduit means leading to said hydraulic operating means for said brake, and means for connecting said first and second conduit means together or for disconnecting them and establishing another connection for said second mentioned conduit means, said another connection including a third conduit means connectable with said second conduit means, a fourth conduit means branching from said first conduit means and having a portion thereof in continuous free communication with the latter, and manually controlled means for supplying fluid at operator selected pressures between said fourth and third conduit means and venting fluid from said third conduit means.

8. In combination, an element rotatable to effect drive of a vehicle, a drive clutch for said element having hydraulic operating means, a brake for said element having hydraulic operating means, a pump, an accumulator having a one-way connection with the discharge of said pump, and means for supplying alternatively fluid from the pump discharge to said hydraulic operating means for the drive clutch and fluid from said accumulator to the hydraulic brake operating means.

9. In combination, an element rotatable to effect drive of a vehicle, a drive clutch for said element having hydraulic operating means, a brake for said element having hydraulic operating means, a pump, an accumulator connected with the discharge of said pump, and means for supplying alternatively fluid from the pump discharge to said hydraulic operating means for the drive clutch and fluid from said accumulator to the hydraulic brake operating means, said means for supplying fluid alternatively as aforesaid including a manually controlled operating valve controlling fluid flow from the pump discharge to said drive clutch operating means, and a fluid operated valve device actuated to open position by accumulator fluid and having, for effecting a supply of accumulator fluid to effect its actuation to closed position, a valve actuatable by fluid controlled by said manually controlled operating valve.

10. In combination, an element rotatable to effect drive of a vehicle, a pair of drive clutches selectively loadable to effect drive of said element in opposite directions and each having hydraulic operating means, a brake for said element having hydraulic operating means, a pump, an accumulator having a connection with the discharge of said pump, said connection including a check valve for preventing flow of fluid from said accumulator back to the pump discharge, means for supplying fluid from said pump selectively to either of said first hydraulic means while venting the other, or to both of said first hydraulic means at once, and means under the control of said last mentioned means for supplying fluid from said accumulator to said hydraulic operating means for said brake when neither of said pair of hydraulic operating means is supplied with fluid from the pump discharge.

11. In combination, an element rotatable to effect drive of a vehicle, a pair of drive clutches selectively loadable to effect drive of said element in opposite directions each having hydraulic operating means, a brake for said element having hydraulic operating means, a pump, an accumulator connected with the discharge of said pump, said connection including a check valve for prevening flow of fluid from said accumulator back to the pump discharge, means for supplying fluid from said pump selectively to either of said first hydraulic means while venting the other, or to both of said first hydraulic means at once, and means including controlling valves supplied with throwing fluid from the pump discharge when fluid to effect clutch loading is supplied, for supplying fluid from said accumulator to said hydraulic operating means for said brake when neither of said pair of hydraulic operating means is supplied with fluid from the pump discharge.

12. In combination, an element rotatable to effect drive of a vehicle, a pair of drive clutches selectively loadable to effect drive of said element in opposite directions and each having hydraulic operating means, a brake for said element having hydraulic operating means, a pump, an accumulator connected with the discharge of said pump, said connection including a check valve for preventing flow of fluid from said accumulator back to the pump discharge, means for supplying fluid from said pump selectively to either of said first hydraulic means, comprising controlling valves therefor including valves individually controlled by fluid from the pump discharge and operative, upon supply to them of fluid from the pump discharge, to effect clutch loading, and means for supplying fluid from said accumulator to said hydraulic operating means for said brake when neither of said pair of hydraulic operating means is supplied with fluid from the pump discharge.

13. In combination, in a vehicle propelling and braking apparatus, a pair of elements rotatable to effect vehicle propulsion and brakable to effect vehicle turning and stopping, means for driving said elements, and hydraulically actuated braking means individual to said elements, means for supplying fluid to the braking means for each element upon the disconnection of the drive of the latter including conduit portions leading individually to said braking means and other conduit portions for delivering fluid to said first mentioned conduit portions, and means for placing said braking means under manual control including a control valve shiftable to disconnect said first mentioned conduit portions from said other conduit portions, a brake selector valve having means for shifting the same supplied with fluid pressure from said other conduit portions, said control valve connecting said first mentioned conduit portions with said brake selector valve when it disconnects them from said other conduit portions and a manual brake valve connected to receive fluid from either or both of said other conduit portions and manually operable to supply, under the control of said brake selector valve, fluid to said braking means.

14. In combination, in a vehicle propelling and braking apparatus, a pair of elements rotatable to effect vehicle propulsion and brakable to effect vehicle turning and stopping, means for driving said elements in either direction, and hydraulically actuated braking means individual to said elements, means for supplying fluid to the braking means for each element upon the disconnection of the drive of the latter including conduit portions leading individually to said braking means and other conduit portions for delivering fluid to said first mentioned conduit portions, and means for placing said braking means under manual control including a control valve shiftable to disconnect said first mentioned conduit portions from said other conduit portions, a brake selector valve having means for shifting the same supplied with fluid pressure from said other conduit portions, said control valve connecting said first mentioned conduit portions with said brake selector valve when it disconnects them from said other conduit portions, and a manual brake valve connected to receive fluid from either or both of said other conduit portions and manually operable to supply, under the control of said brake selector valve, fluid to said braking means.

15. In combination, in a vehicle propelling and braking apparatus, a pair of elements rotatable to effect vehicle propulsion and brakable to effect vehicle turning and stopping, means for driving said elements and hydraulically actuated braking means individual to said elements, means for supplying fluid to the braking means for each element upon the disconnection of the drive of the latter including conduit portions leading individually to said braking means and other conduit portions for delivering fluid to said first mentioned conduit portions, and means for placing said braking means under manual control including a control valve shiftable to disconnect said first mentioned conduit portions from said other conduit portions, a brake selector valve having means for shifting the same supplied with fluid pressure from said other conduit portions, said control valve connecting said first mentioned conduit portions with said brake selector valve when it disconnects them from said other conduit portions and a manual brake valve connected to receive fluid from either or both of said other conduit portions and manually operable to supply, under the control of said brake selector valve, fluid to either or both of said braking means.

16. In combination, in a vehicle propelling and braking apparatus, a pair of elements rotatable to effect vehicle propulsion and brakable to effect vehicle turning and stopping, means for driving said elements and hydraulically actuated braking means individual to said elements, means for supplying fluid to the braking means for each element upon the disconnection of the drive of the latter including conduit portions leading individually to said braking means and other conduit portions for delivering fluid to said first mentioned conduit portions, and means for placing said braking means under manual control including a control valve shiftable to disconnect said first mentioned conduit portions from said other conduit portions, a brake selector valve having means for shifting the same supplied with fluid pressure from said other conduit portions, and a manual brake valve having check valve controlled connections with each of said other conduit portions by which it is supplied fluid from either or both of said other conduit portions and manually operable to supply, under the control of said brake selector valve, fluid to said braking means.

17. In combination, an element to be selectively driven and braked, and driving and braking means therefor including a hydraulically operable clutch, a hydraulically applicable brake, a fluid reservoir, a pump having its intake connected with said reservoir and its discharge connected with a fluid conduit, a pressure fluid storage reservoir having a check valve controlled supply connection with said fluid conduit, a manually controlled operating valve device also connected with said fluid conduit, a conduit leading from said valve device to said hydraulically operable clutch, a vent line leading from said valve device, said valve device operable selectively to connect said fluid conduit with said hydraulically operable clutch and to connect the latter with said vent line, and valve means for connecting said hydraulically applicable brake with said pressure fluid storage reservoir, to effect brake application, upon connection of said hydraulically operable clutch to the vent line, including a valve element having an operating connection with said conduit leading from said operating valve device to said hydraulically operable clutch.

18. In combination, an element to be selectively driven and braked, and driving and braking means therefor including a hydraulically operable clutch, a hydraulically applicable brake, a fluid reservoir, a pump having its intake connected with said reservoir and its discharge connected with a fluid conduit, a pressure fluid storage reservoir having a check valve controlled supply connection with said fluid conduit, a manually controlled operating valve device also connected with said fluid conduit, a conduit leading from said valve device to said hydraulically operable clutch, a vent line leading from said valve device, said valve device operable selectively to connect said fluid conduit with said hydraulically operable clutch and to connect the latter with said vent line, and valve means for connecting said hydraulically applicable brake with said pressure fluid storage reservoir, to effect brake application upon connection of said hydraulically operable clutch to the vent line, including a valve element having an operating connection with said conduit leading from said operating valve device to said hydraulically operable clutch and having an area continuously subjected in a valve moving direction to pressure fluid from said pressure fluid storage reservoir.

19. In combination, an element to be selectively driven and braked, and driving and braking means therefor including a hydraulically operable clutch, a hydraulically applicable brake, a fluid reservoir, a pump having its intake connected with said reservoir and its discharge connected with a fluid conduit, a pressure fluid storage reservoir having a check valve controlled supply connection with said fluid conduit, a manually controlled operating valve device also connected with said fluid conduit, a conduit leading from said valve device to said hydraulically operable clutch, a vent line leading from said valve device, said valve device operable selectively to connect said fluid conduit with said hydraulically operable clutch and to connect the latter with said vent line, and valve means for connecting said hydraulically applicable brake with said pressure fluid storage reservoir, to effect brake application upon connection of said hydraulically operable clutch to the vent line, including a valve element having an area continuously subjected to pressure fluid from said pressure fluid storage reservoir and a larger area for overriding the action of fluid on said first area and an operating connection between said larger area and the conduit leading from said operating device to said hydraulically operable clutch.

20. In combination, in a vehicle propelling and braking apparatus, a pair of elements rotatable to effect vehicle propulsion and brakable to effect vehicle turning and stopping, means for driving said elements, and hydraulically actuated braking means individual to said elements, means for supplying fluid to the braking means for each element upon the disconnection of the drive of the later including conduits individual to each of said braking means, and means for selectively subjecting said braking means to the fluid as supplied to said conduits or at an operator determined lower pressure, including an operator controlled braking pressure determining valve and a valve movable to control the inclusion or exclusion of said operator controlled braking pressure determining valve in the control of said braking means.

21. In combination, in a vehicle propelling and braking apparatus, a pair of elements rotatable to effect vehicle propulsion and brakable to effect vehicle turning and stopping, means for driving said elements and hydraulically actuated braking means individual to said elements, means for supplying fluid to the braking means for each element upon the disconnection of the drive of the latter including conduits individual to each of said braking means, and means for selectively subjecting said braking means to the fluid as supplied to said conduits or at an operator determined lower pressure, including an operator controlled braking pressure determining valve and a valve movable to control the inclusion or exclusion of said operator controlled braking pressure determining valve in the control of said braking means and also a valve for automatically determining the hydraulically actuated braking means to be actuated, in accordance with the particular conduit supplied with fluid.

22. In combination, an element to be selectively driven and braked, and driving and braking means therefor including a hydraulically operable clutch for effecting drive of said element in one direction, a hydraulically operable clutch for effecting drive of said element in an opposite direction, a hydraulically applicable brake, a fluid reservoir, a pump having its intake connected with said reservoir and its discharge connected with a fluid conduit, a manually controlled operating valve device connected with said fluid conduit, control conduits leading from said valve device to each of said hydraulically operable clutches, a vent line leading from said valve device to said reservoir, said valve device operable to connect said control conduits separately with said fluid conduit to supply fluid to said hydraulically operable clutches and to connect each of said hydraulically operable clutches to the vent line while the other is connected to the pump discharge and also to connect both of said hydraulically controlled clutches simultaneously to the vent line, a source of fluid under pressure available when said pump is not running, and valve means for connecting said hydraulically applicable brake with said source to effect brake application, whenever said hydraulically operable clutches are both connected to the vent line, including valve elements each having operating connection with one of the conduits leading from the operating valve device to a hydraulically operable clutch.

23. In combination, an element to be selectively driven and braked, and driving and braking means therefor including a hydraulically operable clutch for effecting drive of said element, a hydraulically applicable brake, a fluid reservoir, a pump having its intake connected with said reservoir and its discharge connected with a fluid conduit, a manually controlled operating valve device connected with said fluid conduit, a control conduit leading from said valve device to said hydraulically operable clutch, a vent line leading from said valve device to said reservoir, said valve device operable to connect said control conduit with said fluid conduit to supply fluid to said hydraulically operable clutch and to connect said hydraulically operable clutch to the vent line, a source of fluid under pressure available when said pump is not running, and valve means for connecting said hydraulically applicable brake with said source to effect brake application when said hydraulically operable clutch is connected to the vent line, including a valve element having an operating connection with the conduit leading from the operating valve device to the hydraulically operable clutch.

24. In a valve mechanism for controlling the application and release of fluid relative to a device to be controlled, in combination, a valve box having valve device and plunger device receiving bores formed therein, said valve box having a first connection for supplying operating fluid to one end of one of said bores and a second connection for supplying operating fluid to one end of another of said bores, each of said connections being adapted to vent its corresponding bore when the other connection is supplying operating fluid to the other bore, a connection for a source of pressure, a vent connection, a work port for connection, valve devices in said bores for controlling connection between said connection for a source of pressure and said work port, and between said work port and said vent connection, and plunger devices in said bores and associated with said valve devices for effecting, on fluid flow in one direction relative to either of said first and said second connections, the establishment of said connection between said connection for a source of pressure and said work port, and, on fluid flow in the other direction relative to either of said first and said second connections, the establishment of said connection between said vent connection and said work port, certain of said devices having portions for the action thereon of biasing pressure and at least one continuously subjected to pressure biasing the same in a direction opposite that in which pressure supplied by said first and said second connections acts.

25. In a valve mechanism for controlling the application and release of fluid relative to a device to be controlled, in combination, a valve box having valve device and plunger device receiving bores formed therein, said valve box having a first connection for supplying operating fluid to one end of one of said bores and a second connection for supplying operating fluid to one end of another of said bores, each of said connections being adapted to vent its corresponding bore when the other connection is supplying operating fluid to the other bore, a connection between one point along the length of one of said parallel bores with a point differently located along the length of the other of said bores, a work port for connection, valve devices in said bores for controlling connection between said connection for a source of pressure and said work port, and between said work port and said vent connection, and plunger devices in said bores and associated with said valve devices for effecting, on fluid flow in one direction relative to either of said first and said second connections, the establishment of said connection between said connection for a source of pressure and said work port, and on fluid flow in the other direction relative to either of said first and said second connections, the establishment of said connection between said vent connection and said work port, certain of said devices having portions for the action thereon of biasing pressure and at least one continuously subjected to pressure biasing the same in a direction opposite that in which pressure supplied by said first and said second connections acts.

26. In a valve mechanism for controlling the application and release of fluid relative to a device to be controlled, in combination, a valve box having valve device and plunger device receiving bores formed therein, said valve box having a first connection for supplying operating fluid to one end of one of said bores and a second connection for supplying operating fluid to one end of another of said bores, each of said connections being adapted to vent its corresponding bore when the other connection is supplying operating fluid to the other bore, a connection for a source of pressure, a vent connection, a work port for connection to a device to be controlled, valve devices in said bores for controlling connection between said connection for a source of pressure and said work port, and between said work port and said vent connection, and plunger devices in said bores and associated with said valve devices for effecting, on fluid flow in one direction relative to either of said first and second connections, the establishment of said connection between said connection for a source of pressure and said work port, and, on fluid flow in the other direction relative to either of said first and said second connections, the establishment of said connection between said vent connection and said work port, said valve devices both controlling and each movable individually in one direction to interrupt the connection between the connection with a source of pressure and said work port.

27. In a valve mechanism for controlling the application and release of fluid relative to a device to be controlled, in combination, a valve box having valve device and plunger device receiving bores formed therein, said valve box having a first connection for alternatively supplying and venting operating fluid relative to one end of one of said bores and a second connection for alternatively supplying and venting operating fluid relative to one end of another of said bores, a connection for a source of pressure, a vent connection, a work port for connection to a device to be controlled, valve devices in said bores for controlling connection between said connection for a source of pressure and said work port, and between said work port and said vent connection, and plunger devices in said bores and associated with said valve devices for effecting, on fluid flow in one direction relative to either of said first and said second connections, the establishment of said connection between said connection for a source of pressure and said work port, and, on fluid flow in the other direction relative to either of said first and second connections, the establishment of said connection between said vent connection and said work port, certain of said devices having portions for the action thereon of biasing pressure, and means for subjecting said portions to biasing pressure for biasing the same in a direction opposite that in which pressure supplied by said first and said second connections acts.

References Cited in the file of this patent

UNITED STATES PATENTS

| | | |
|---|---|---|
| 1,146,526 | Scanlan | July 13, 1915 |
| 1,619,701 | Charlton | Mar. 1, 1927 |
| 1,869,085 | Williamson | July 26, 1932 |
| 2,353,554 | Gates | July 11, 1944 |
| 2,365,536 | Fischer | Dec. 19, 1944 |
| 2,378,082 | Hood | June 12, 1945 |
| 2,389,498 | Gates | Nov. 20, 1945 |
| 2,409,506 | McFarland | Oct. 15, 1946 |
| 2,475,298 | Sloan | July 5, 1949 |
| 2,503,891 | Van Voorhis | Apr. 11, 1950 |
| 2,523,766 | Kelley | Sept. 26, 1950 |
| 2,535,300 | Le Tourneau | Dec. 26, 1950 |
| 2,567,073 | Kupiel | Sept. 9, 1951 |
| 2,580,381 | Banker | Jan. 1, 1952 |
| 2,580,946 | Orshansky | Jan. 1, 1952 |
| 2,596,931 | Kelley | May 13, 1952 |
| 2,635,584 | Jacques | Apr. 21, 1953 |
| 2,712,370 | Westfall | July 5, 1955 |